US007370807B2

(12) United States Patent
Buursma et al.

(10) Patent No.: US 7,370,807 B2
(45) Date of Patent: May 13, 2008

(54) IDENTITY CARD AND TRAVEL DOCUMENT

(75) Inventors: Cornelis Buursma, Haarlem (NL); Wilhelmus Johannes Wesselink, Haarlem (NL); Jan van den Berg, Gouda (NL)

(73) Assignee: SDU Identification B.V., Haarlem (NL)

( * ) Notice: Subject to any disclaimer, the term of this patent is extended or adjusted under 35 U.S.C. 154(b) by 0 days.

(21) Appl. No.: 10/546,570

(22) PCT Filed: Feb. 24, 2004

(86) PCT No.: PCT/NL2004/000137

§ 371 (c)(1),
(2), (4) Date: May 15, 2006

(87) PCT Pub. No.: WO2004/074000

PCT Pub. Date: Sep. 2, 2004

(65) Prior Publication Data

US 2006/0261171 A1 Nov. 23, 2006

(30) Foreign Application Priority Data

Feb. 24, 2003 (NL) .................................... 1022766

(51) Int. Cl.
*G06K 19/06* (2006.01)

(52) U.S. Cl. ...................... 235/492; 235/487; 235/488

(58) Field of Classification Search ................ 265/487, 265/488, 492, 380, 490
See application file for complete search history.

(56) References Cited

U.S. PATENT DOCUMENTS

| | | | | |
|---|---|---|---|---|
| 4,318,554 | A | 3/1982 | Anderson et al. | |
| 4,727,246 | A * | 2/1988 | Hara et al. | 235/488 |
| 4,788,102 | A * | 11/1988 | Koning et al. | 428/40.1 |
| 4,795,895 | A * | 1/1989 | Hara et al. | 235/492 |
| 5,412,199 | A * | 5/1995 | Finkelstein et al. | 235/487 |
| 5,522,623 | A | 6/1996 | Soules et al. | |
| 5,690,773 | A | 11/1997 | Fidalgo et al. | |
| 5,880,934 | A * | 3/1999 | Haghiri-Tehrani | 361/737 |
| 6,135,503 | A | 10/2000 | Lob et al. | |
| 6,213,702 | B1 * | 4/2001 | Wesselink | 412/1 |
| 6,404,643 | B1 * | 6/2002 | Chung | 361/737 |
| 6,514,367 | B1 * | 2/2003 | Leighton | 156/153 |
| 6,557,766 | B1 * | 5/2003 | Leighton | 235/488 |
| 6,568,600 | B1 * | 5/2003 | Carpier et al. | 235/492 |
| 6,923,378 | B2 * | 8/2005 | Jones et al. | 235/488 |
| 2003/0234286 | A1 * | 12/2003 | Labrec et al. | 235/380 |

FOREIGN PATENT DOCUMENTS

| | | | |
|---|---|---|---|
| DE | 199 15 765 | A1 | 10/2000 |
| EP | 0 523 304 | A1 | 1/1993 |
| EP | 0 805 409 | A2 | 11/1997 |
| WO | WO 98/19870 | A1 | 5/1998 |

* cited by examiner

*Primary Examiner*—Michael G. Lee
*Assistant Examiner*—Paultep Savusdiphol
(74) *Attorney, Agent, or Firm*—The Webb Law Firm

(57) ABSTRACT

An identity card that can be used, for example, in a travel document or as a separate card, includes at least two core layers, preferably of polycarbonate material, that are fused to one another. In each of the core layers there is a recess, each of a different size. On assembly these recesses become situated on top of one another and a semiconductor chip is accommodated in the larger recess formed as a result. A covering layer can be fused to at least one of the core layers, and a layer that can be written on by laser can also be applied. There can be (semi-)transparent windows on top of one another in the core layer and if the covering layer is transparent, light can be transmitted, it being possible to define a specific pattern in the windows.

14 Claims, 2 Drawing Sheets

IDENTITY CARD AND TRAVEL DOCUMENT

BACKGROUND OF THE INVENTION

1. Field of the Invention

The present invention relates to an identity card having a layered plastic structure.

2. Description of Related Art

A prior art identity card is disclosed in U.S. Pat. No. 4,318,554 A. This document discloses a card used for medical or information purposes, wherein one of the core layers is provided with a hole through it in which a chip is placed. This core layer is then laminated to the adjoining core layer. The adjoining core layer is preferably made of paper, but can likewise comprise a plastic material.

WO 98/19870 discloses a passport wherein the identity part is made up of layers and can be written on with the aid of a laser beam.

What is needed, however, and not disclosed in the prior art, is an identity card that has a large number of security features that are easy to detect.

SUMMARY OF THE INVENTION

The present invention is an identity card which can be formed as a blank in a first location and which can be provided with specific information in a second location. Because of the many special security features, this identity card is built up in layers. The construction in layers is easy to carry out but, on the other hand, in order to prevent forgeries, the identity card is resistant to separation of the layers from one another after production.

The identity card includes an antenna arranged between fused core layers and which extends around the periphery thereof, each core layer has a thickness of between 50 and 600 μm, first and second core layers are each provided with a recess, said recesses being above one another in the assembled position and having different dimensions, and a chip is arranged in said recesses and is connected to the antenna.

In contrast to, for example, identity cards based on bonded laminates, according to the present invention, these laminates consist of plastic material layers that have been fused together. Examples thereof are PVC, polycarbonate and polyester. Such layers are melted and laminated together at a temperature a little above the softening point. A continuous assembly is then produced that cannot be separated without visible damage. When laminating together, the chip and the antenna are placed between the layers. That is to say, the identity card is provided with a chip that provides security and does not function by means of contacts but is activated via an antenna (coil) and transmits signals. There is also a layer that can be written on by laser light. This layer can be arranged either in a core layer or in a covering layer, or applied as a separate layer between the core layer and the covering layer. Such a layer that can be written on by laser makes it possible to provide the blank identity card with information specific to the bearer in the second location, this not being the location where the blank identity card is produced.

Herein, recess is understood to be a cavity which is not a hole passing right through, but has an end limit, which, of course, consists of the material of the core layer concerned. That is to say, after fusing the two core layers together the assembly thus obtained is covered by the core layer material on all sides. Even at the location of the chip the outer boundary is always formed by the material of the core layer.

According to a particular embodiment of the invention, the cavity that is formed by the recesses in the first and second core layers that have been placed on top of one another is somewhat smaller than the volume of the chip. Moreover, desirably no recess at all is provided for the antenna. Only when laminating together is the recess for the antenna formed by the enclosure thereof and, moreover, if the volume of the cavity is smaller than the volume of the chip, the volume of the cavity is formed, the recesses being somewhat enlarged during lamination in order to accommodate the chip with a very tight fit.

The laser engraving described above of the layer that can be written on by laser light is effected through the entire thickness thereof.

The identity card described above makes it possible to incorporate numerous security features without appreciably increasing the costs thereof, it, moreover, not being easily possible to change the security features. Because the various layers comprising the covering layer are fusible, there is no risk that changes can be made to the identity card without damage.

A few of these security features will be described below. A first security feature is to make windows in the core layers that are otherwise opaque. By positioning the windows in the adjoining two or more core layers on top of one another, transparency through the card can be obtained. This transparency can be complete, but it is also possible to provide partial transparency, as a result of which specific patterns are produced. Such patterns are similar to the patterns that are found in watermarks in paper.

Another security feature comprises the provision of hologram-like structures. It is also possible to use specific types of inks or images, in which case it is possible to detect different colours or different images by tilting the card relative to a light source (optically variable ink and optically variable design, respectively). Furthermore, it is possible to provide information by printing information lines rather than by simply printing raster patterns. Raster patterns can be provided as a security feature in the form of small openings. Such a raster pattern can, for example, be used to display the photograph of the bearer. It is also possible to apply other biometric data on the bearer to the card. In this context consideration can be given to iris information, face recognition and information with regard to fingerprints.

These features, which make the identity card unique, are all relatively easy to detect. Even people who are not specialised are able to check whether such features are present and to what extent there has been fraudulent interference therewith.

It will be understood that further security characteristics can also be provided in the card according to the invention.

The invention also relates to a travel document such as a passport comprising a booklet provided with pages, with a lip protruding from the spine to which the identity card described above is attached. Preferably, such a lip, that is to say the interleaved part, consists of a plastic material with particularly good (film) hinging properties. Because it is important that the identity card is joined to the lip such that it cannot be detached, according to a particular embodiment it is proposed to provide such a lip with a series of openings. The identity card is then fitted on one side of the lip and a strip is placed on the other side. This strip is provided with a number of stubs that extend through the openings. By then fusing the strip to the identity card it is not possible to separate the identity card from the rest of the booklet without visible damage.

DETAILED DESCRIPTION OF THE INVENTION

Figure 1:
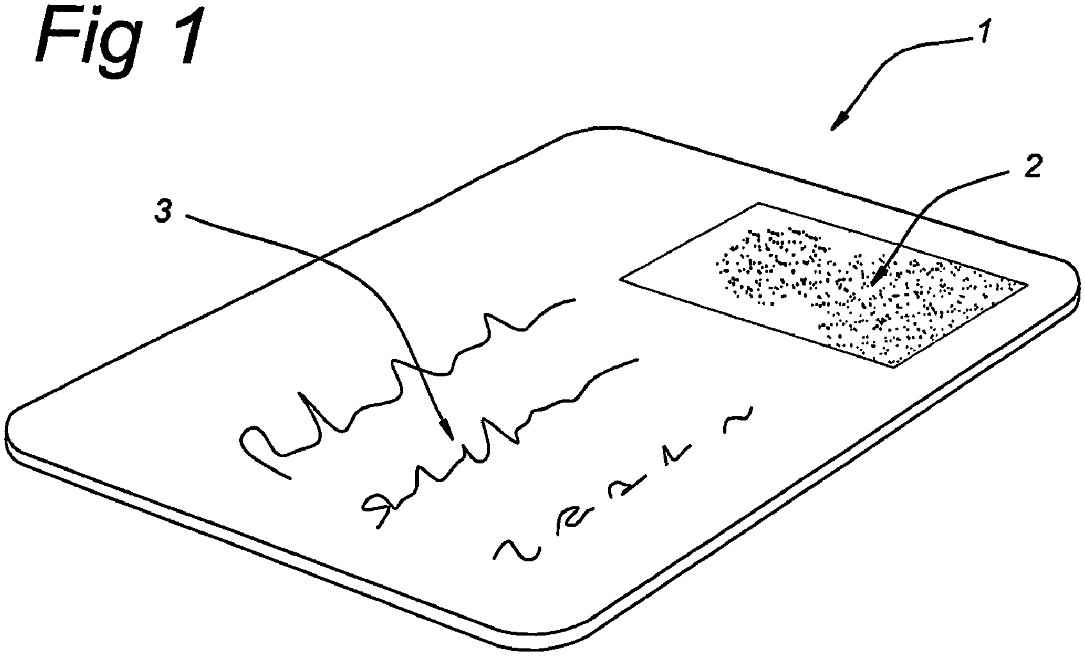
FIG. 1 shows a perspective view of an identity card according to the invention.

In FIG. 1 an identity card is indicated in its entirety by 1. This card is rectangular and contains a photographic image 2 of the bearer. This image 2 consists of a number of perforations that extend through some of the layers in the identity card. Readable information relating to the bearer and the issuing authority is indicated by 3. Such information can also contain security features.

Figure 2:
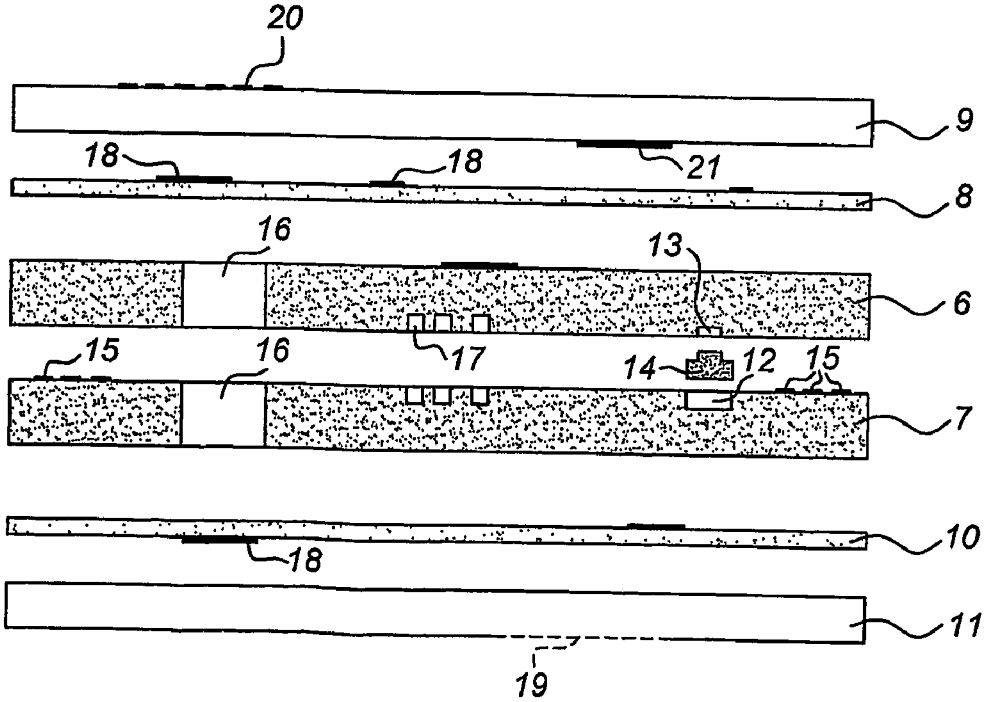
FIG. 2 shows a cross-sectional and exploded view of the various layers from which the identity card according to FIG. 1 is made up.

The make-up of the identity card is shown diagrammatically in FIG. 2. This identity card is comprised of two core layers 6 and 7. It must be understood that there can be more than two such core layers 6 and 7. According to a preferred embodiment these core layers are comprised of polycarbonate material, but it must be understood that other fusible materials can be used. Adjoining the first core layer 6 there is a layer 8 that can be written on by laser. A transparent covering layer 9 is applied on top of this. On the other side, that is to say adjoining the second core layer 7, a layer 10, that likewise can be written on by laser, is applied, on top of which a covering layer 11, which is likewise transparent, is placed. In the assembled condition the various layers are fused together. If the combination contains non-fusible layers, these must be provided with openings through which the fusible material can extend.

First core layer 6 is provided with recess 13, whilst second core layer 7 is provided with recess 12. When the first core layer 6 and second core layer 7 are placed on top of one another, a larger recess is thus delimited that is just sufficient to accommodate a chip 14. Windings of an antenna/coil, which is connected to the chip in a manner that is not shown, are indicated by 15. By this means it is possible to exchange information with the surroundings without electrical contact being required. The printed information is indicated by 18. This printed information is applied after joining the card together, by writing on the card with the aid of a (for example YAG) laser. The first and second core layers are made opaque. White is mentioned as pigment by way of example. Windows are indicated by 16. These can be openings that are transparent to a greater or lesser extent. As a result of the covering layers 9 and 11 being transparent it is possible to see through the card, which constitutes a further security feature. There are semi-transparent windows 17. The pattern applied in these is visible to the user and manifests itself as a watermark.

Matting is indicated by 19, whilst 20 indicates a relief. These are further security features that can easily be detected by the user.

Further features can be introduced in a manner that is not shown in more detail. The chip can contain information with regard to a check on iris, face or fingerprint. An optically variable device in the form of a holographic structure is indicated by 21.

There can be other printed information that comprises optically variable ink.

Figure 3:
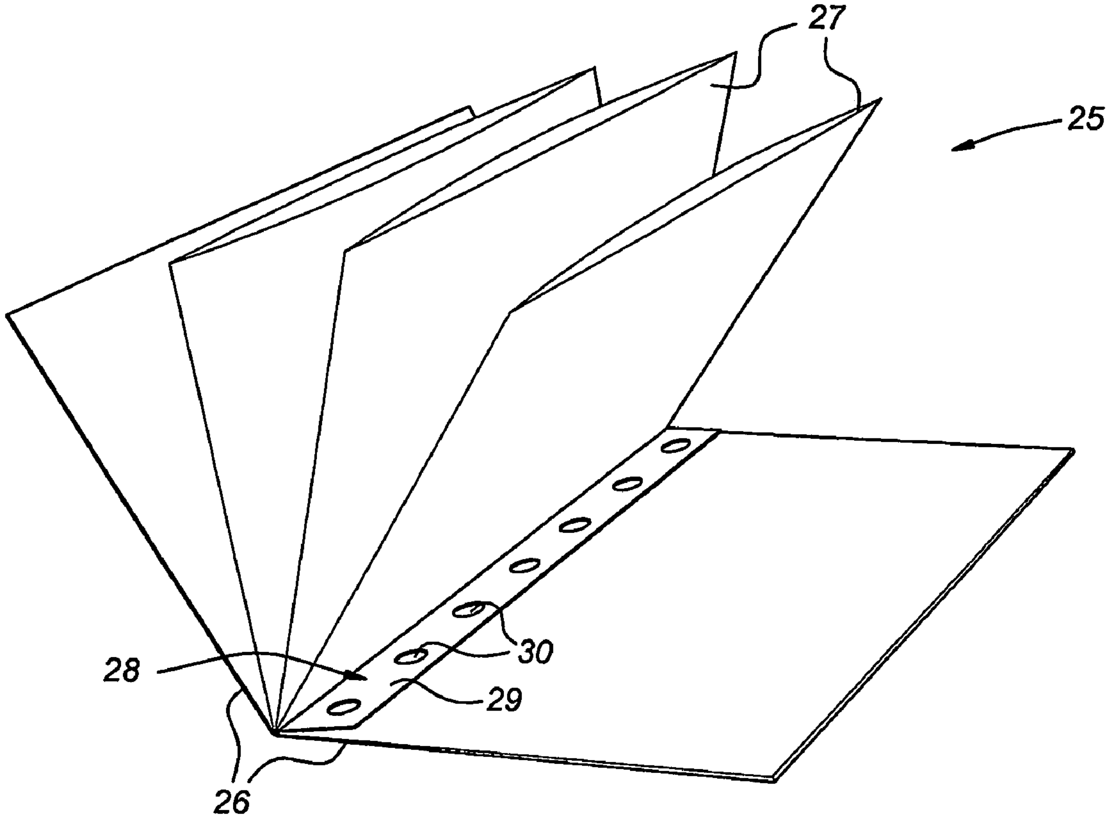
FIG. 3 shows a travel document provided with the identity card according to FIGS. 1 and 2.
Figure 4:
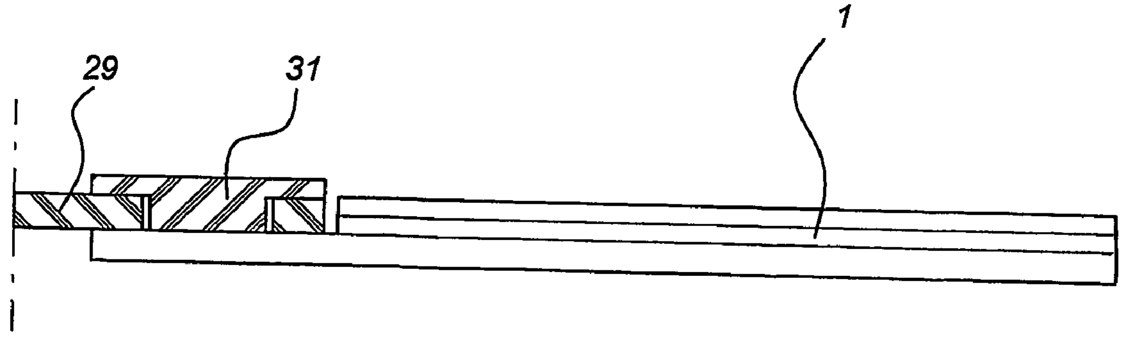
FIG. 4 shows a detail of the fixing of the identity card to the travel document.

The card described above can be used both on its own and in combination with a further information carrier. An example of the latter is given in FIG. 3 and this travel document is indicated in its entirety by 25. It comprises a cover 26 in which a number of pages 27, for example for introducing a visa, have been placed. An interleaved part is indicated by 28 and this comprises a lip 29. Such a lip is made from a material with good hinging properties, that is to say it does not exhibit any fatigue and has a high strength and cannot easily be torn out. An example of such a material is polypropene. Holes 30 have been punched in this lip 29. Fixing of identity card 1 takes place as shown in the detail in FIG. 4. The identity card 1 is on one side of the lip 29 and a strip 31 is applied to the other side. This strip 31 is provided with pins or stubs that extend through the openings 30. Strip 31 is preferably made from a material that can be fused with the identity card 1. The join, which cannot be undone without visible damage, is produced by fusing both the top part of the strip 31 and the stubs, which extend through the openings 30, of strip 31 with card 1, whilst it is impossible to introduce another identity card into the travel document without this being immediately apparent to an inspector with the naked eye.

After reading the above description, variants will be immediately apparent to those skilled in the art. These variants fall within the scope of the appended claims.

The invention claimed is:

1. An identity card comprising:

first and second core layers of plastic material fused together, wherein said first core layer has an accommodation;

a semiconductor chip which extends in said accommodation;

an antenna connected to said chip being arranged between said fused core layers and extends around the periphery thereof, wherein each core layer has a thickness of between 50 and 600 μm, said accommodation comprises a recess and said second core layer is provided with a recess, said recesses being above one another in the assembled position and having different dimensions;

a covering layer arranged on said first core layer and another covering layer applied to said second core layer; and a layer being provided between said covering layer and said second core layer that can be written on by laser light.

2. The identity card of claim 1, wherein said layer that can be written on by laser light comprises a separate layer that is arranged between said covering layer and said first core layer and can be fused therewith.

3. The identity card of claim 1, wherein said covering layer is transparent.

4. The identity card of claim 1, wherein at least one of said layers comprises polycarbonate.

5. The identity card of claim 1, wherein transparent windows are arranged in said first and second core layers, which windows are on top of one another in the assembled state.

6. The identity card of claim 5, wherein said windows are clear.

7. The identity card of claim 5, wherein said windows are provided in a semi-transparent pattern.

8. The identity card of claim 1, containing biometric characteristics of the bearer.

9. The identity card of claim 8, containing a raster photograph.

10. The identity card of claim 8, containing iris information.

11. The identity card of claim 8, containing fingerprint information.

12. The identity card of claim 8, containing face information.

13. A travel document comprising a booklet provided with pages, with a lip protruding from a spine to which an identity card is fixed, said identity card comprising:

first and second core layers of plastic material fused together, wherein said first core layer has an accommodation;

a semiconductor chip which extends in said accommodation;

an antenna connected to said chip being arranged between said fused core layers and extends around the periphery thereof, wherein each core layer has a thickness of between 50 and 600 μm, said accommodation comprises a recess and said second core layer is provided with a recess, said recesses being above one another in the assembled position and having different dimensions;

a covering layer arranged on said first core layer and another covering layer applied to said second core layer; and a layer being provided between said covering layer and said second core layer that can be written on by laser light.

14. The travel document of claim 13, wherein said fixing comprises a pattern of holes made in said lip and a closing strip fitted through said pattern of holes and fused with said identity card.

* * * * *